United States Patent
Casteel et al.

(10) Patent No.: US 6,174,396 B1
(45) Date of Patent: Jan. 16, 2001

(54) METHOD OF MANUFACTURING A TRIM PANEL HAVING A HANDLE

(75) Inventors: Donald Casteel, Athens; John Muller, Englewood, both of TN (US)

(73) Assignee: Davidson Textron, Inc., Dover, NH (US)

( * ) Notice: Under 35 U.S.C. 154(b), the term of this patent shall be extended for 0 days.

(21) Appl. No.: 08/123,092

(22) Filed: Sep. 20, 1993

(51) Int. Cl.[7] .......................... B32B 31/04; B32B 31/16; B32B 31/20
(52) U.S. Cl. .......................... 156/213; 156/212; 156/214; 156/215
(58) Field of Search ..................... 156/212, 213, 156/214, 215, 285, 286, 382; 296/37.13, 153, 146.7; 264/510, 511

(56) References Cited

U.S. PATENT DOCUMENTS

| | | |
|---|---|---|
| 2,656,294 | * 10/1953 | Hunt ..................................... 156/213 |
| 2,876,498 | 3/1959 | Nason . |
| 3,068,044 | * 12/1962 | Wilfert ................................. 296/153 |
| 3,467,741 | 9/1969 | Kesling . |
| 3,875,280 | 4/1975 | Story . |
| 3,895,475 | 7/1975 | Wolfelsperger . |
| 4,016,230 | 4/1977 | Michel . |
| 4,568,404 | 2/1986 | Herring . |
| 4,740,417 | 4/1988 | Tornero . |
| 4,890,877 | * 1/1990 | Ashtiani-Zarandi .............. 296/146.7 |
| 5,252,164 | * 10/1993 | Mills .................................... 156/212 |

FOREIGN PATENT DOCUMENTS 0117077   10/1978   (JP) .

* cited by examiner

Primary Examiner—Adrienne C. Johnstone
(74) Attorney, Agent, or Firm—Reising, Ethington, Barnes, Kisselle, Learman & McCulloch, PC

(57) ABSTRACT

A trim panel having an integral handle is made using a subassembly comprising a structural substrate that has a handle hole and a handle frame that spans the handle hole. The subassembly is mounted on a pneumatic buck and a sheet of pliable and stretchable expanded vinyl plastic is then draped over the subassembly to form a decorative cover for the trim panel. The plastic sheet is then vacuum drawn against the top of the subassembly and partially around the handle frame. Draped portions of the plastic sheet between the handle frame and the handle hole, are then cut and trimmed, to complete the wrapping of the handle frame and the edge of the handle hole. The cut ends of the draped portions wrapped around the handle frame are tucked in a longitudinal slot in the underside of the handle frame. The plastic sheet can be also be drawn completely around the handle frame and the pneumatic buck can be provided with a cusp shaped surface aligned with the handle hole to reduce stretching of the plastic sheet when it is drawn around the handle frame.

20 Claims, 2 Drawing Sheets

METHOD OF MANUFACTURING A TRIM PANEL HAVING A HANDLE

BACKGROUND OF THE INVENTION

This invention relates generally to the manufacture of composite thermoplastic parts such as trim panels for automobile doors and more particularly to a method of manufacturing a composite thermoplastic part that has an integral 360 degree handle.

U.S. Pat. No. 4,459,331 granted to James M. Brix et al Jul. 10, 1984 discloses a composite thermoplastic trim panel for an automobile door that includes an integral loop portion for a 360 degree door handle. The trim panel comprises a molded thermoplastic shell that is fitted with an insert that includes a reinforcement for the loop portion. This subassembly is then filled with a cellular material such as reaction injected foam in a secondary operation to provide a composite trim panel that has a partially formed loop. The loop is completed by cutting an endless hole in the composite trim panel and then attaching plates to cover the foam exposed around the periphery of the hole to provide a finished appearance for the door panel.

While this process is suitable for its intended purpose, the process requires the fabrication of cover plates and the attachment of these cover plates to the trim panel after the endless hole is cut to form the loop.

U.S. Pat. No. 5,173,228 granted to Reza Kargarzadeh, Ken E. Tuttle and John A. Grimes Dec. 22, 1992 discloses another foam in place type method that uses a precast skin shell for forming a 360 degree handle in a composite thermoplastic part such as an automobile door trim panel. In this latter method, the molded thermoplastic shell itself is formed with an integral 360 degree handle in a special mold. The molded thermoplastic shell is then fitted with an insert that includes a reinforcement for the integral 360 degree door handle. The subassembly is then filled with a foam material in a secondary operation to provide the composite door trim panel.

This process is also suitable for its intended purpose. However, the process requires complicated equipment for molding the shell with a 360 degree handle and then a difficult assembly of the handle reinforcement in preparation for the foaming operation.

Automobile interior trim door panels can also be made a vacuum forming process as disclosed in U.S. Pat. No. 4,740,417 granted to Roger Tornero Apr. 26, 1988. In this process, a porous foam backed fabric is loosely positioned over a female mold. A substrate is heated sufficiently to sag and then deposited over the female mold so that the sagging substrate contacts the fabric around an effective mold perimeter. Vacuum applied through the female mold is transmitted through the porous foam backed fabric and attracts the sagging substrate into the mold causing contact and adhesion of the heated substrate and the foam backed fabric. This method produces a contoured door panel that has sizeable functional protrusions, such as an arm rest and ridges or depressions that enhance the decorative appearance of the door. However, the door panel does not have any integral loop portions that provide a 360 degree handle.

It is also known from U.S. Pat. No. 3,467,741 granted to Keith K. Kesling Sep. 16, 1969 to vacuum form an inner panel of a refrigerator door so that wooden reinforcing sticks are embedded in the plastic sheet at the tops of integral plastic shelf fronts. This door panel likewise does not have any integral loop portions that provide a 360 degree door handle or any other portions capable of doing so.

SUMMARY OF THE INVENTION

The object of this invention is to provide a method for making a composite thermoplastic article having an integral 360 degree handle that uses vacuum forming techniques for forming the decorative skin of the article.

A feature of the invention it that the method provides a composite plastic molded article that has a 360 degree handle without any need for a cutting a hole through the article after the final molding operation.

Another feature of the invention it that the method provides a composite plastic molded article that has a 360 degree handle that does not require attachment of any plates or other components to provide a finished appearance.

Another feature of the invention is that the method provides a composite plastic molded article that has a 360 degree door handle that does not require any special molds and complicated molding equipment for molding a thermoplastic shell.

Still another feature of the invention is that the method provides a composite plastic molded article that has a 360 degree door handle and a handle frame inside the door handle that is attached to a structural substrate easily.

Yet another feature of the invention it that the method provides a composite plastic molded article that has a 360 degree handle that is completely wrapped by the same facing material that covers the rest of the article.

Still yet another feature of the invention is that the method provides a composite plastic molded article that has a 360 degree door handle that is completely wrapped by a facing material having cut ends that are tucked neatly into a longitudinal slot in the underside of the handle.

DESCRIPTION OF THE DRAWINGS

The above and other objects, features and advantages of the invention will become more apparent from the following description taken in conjunction with the accompanying drawings wherein like references refer to like parts and wherein.

DESCRIPTION OF THE INVENTION

Figure 1:
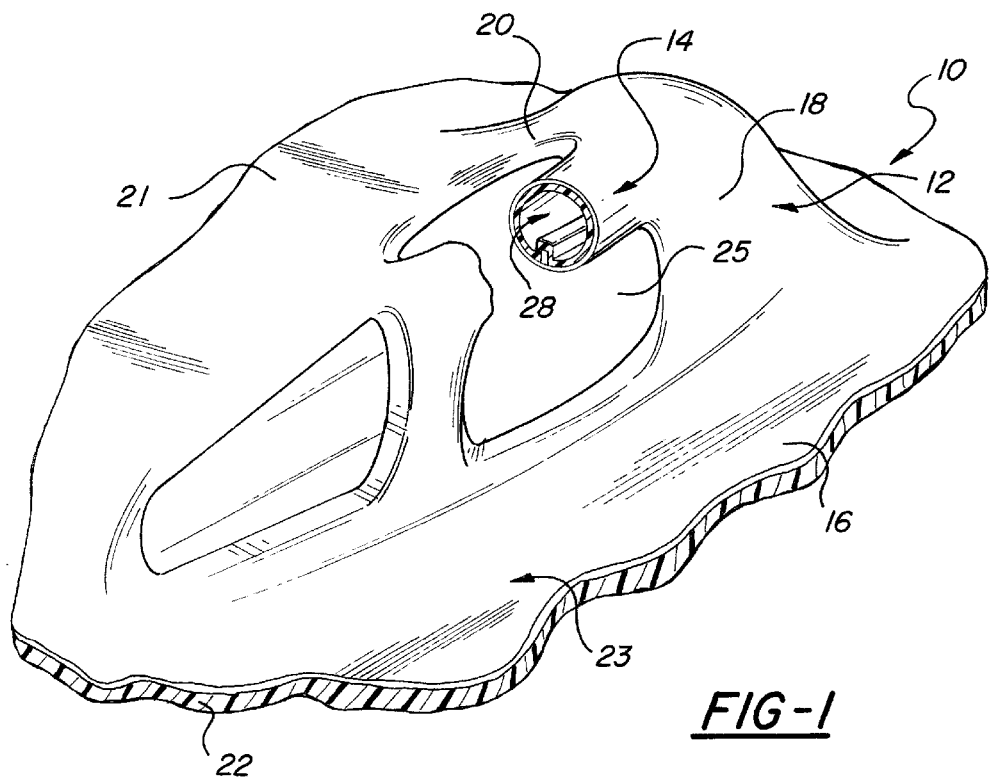
FIG. 1 is a fragmentary perspective view of a trim panel for an automobile door having an integral 360 degree handle that has been fabricated in accordance with this invention.

Referring now to the drawing, FIG. 1 is a perspective view of a vehicle door trim panel 10 that has been fabricated in accordance with this invention. The trim panel 10 includes an arm rest 12 and an integral 360 degree handle 14 that is an integral part of the arm rest 12. The arm rest 12 protrudes from an upper panel portion 16 that is generally vertical when the trim panel 10 is installed on the vehicle door. It comprises a shelf or horizontal portion 18 that supports the fore arm of a seat occupant and a brace portion 20 that slants back, i.e. downwardly and inwardly from the outer end of the horizontal shelf portion 18 to a lower generally vertical portion 21 of the trim panel 10. The handle 14 is located at the outer end of the shelf portion 18 or in other words at the apex of the horizontal shelf portion 18 and the slanted brace portion 20.

The trim panel 10 is a laminated construction comprising a structural substrate 22 and a decorative covering 23 which in this particular example of the invention is an expanded vinyl consisting of 0.080 inch layer 24 of elastomeric foam bonded to a thin skin layer 26 of pliable stretchable polyvinyl chloride. The skin layer 26 can be made of any pliable and stretchable plastic material and the foam layer 24 can be eliminated altogether if a cushion effect is not needed or desired. This invention is generally concerned with the method of applying any suitable type of stretchable decorative covering 23 so that it wraps completely around the 360 degree handle 14.

The structural substrate 22 is preferably shaped by a molding operation and it is preferably made of a relatively stiff structural plastic material such as acrylonitrile butadrene styrene (ABS) or reaction injection molded (RIM) urethanes. It is also possible to use a structural substrate 22 that is made of a light weight metal, such as aluminum and shaped mechanically.

In any event, the structural substrate 22 is shaped so that it has a horizontal shelf portion that is a backing for the horizontal shelf portion 18, a slant back portion that is a backing for the slant back portion 20, and a curved hole 25 that is partly in the horizontal shelf portion and partly in the slant back portion.

It is also important to note that the structural substrate 22 is made so that it has several tiny pores or air passages 27 that extend through it from one face to the other. These pores may be formed in the molding operation or mechanically such as by drilling.

Figure 2:
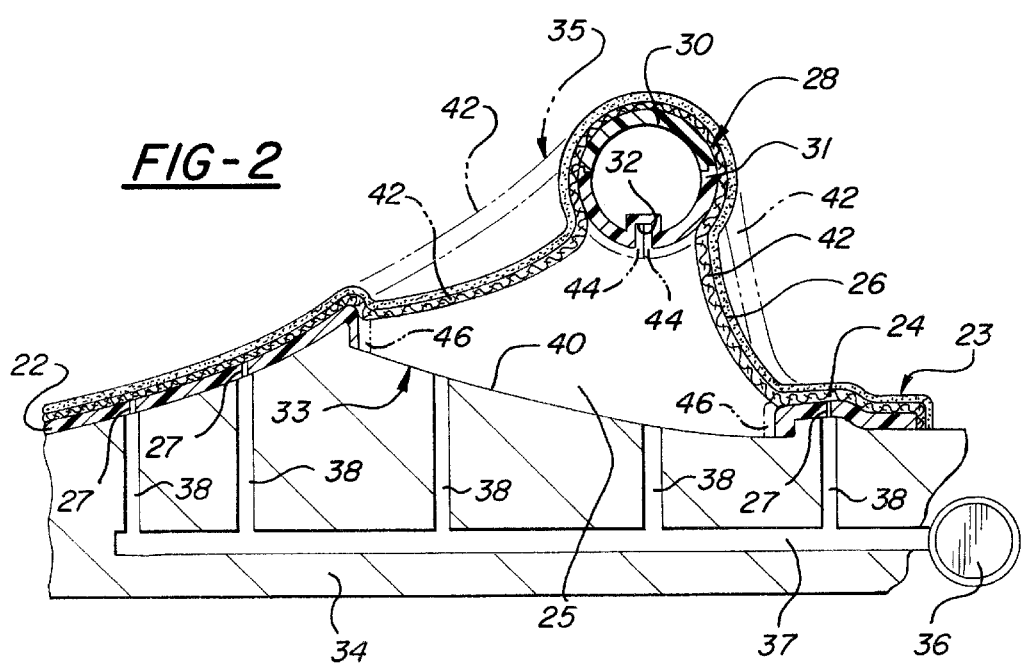
FIG. 2 is a section taken substantially along the line 2—2 of FIG. 1 showing the trim panel of FIG. 1 partially fabricated and mounted on a pneumatic buck for applying an outer decorative cover.

The substrate 22 also includes part of a handle frame 28 that spans the curved hole 25 at the apex of the horizontal shelf portion and the slant back portion. The handle frame 28 comprises two parts—a generally cylindrical outer part 30 that is molded as an integral portion of the substrate 22 and a separate complementary inner part 31. The inner part 31 is formed so that it has a longitudinal slot 32 facing the handle hole 25 when it is snap assembled or otherwise suitably secured to the outer part 30 as shown schematically in FIG. 2. Alternatively, the inner part 31 can be molded as an integral portion of the substrate 22 and the outer part 30 made as a separate part.

Either way the separate inner or outer part 30 or 31 is attached to the substrate 22 to provide a subassembly 33 that includes the complete handle frame 28. This subassembly 33 is then placed on a pneumatic buck 34 and a sheet 35 of expanded vinyl for forming the decorative covering 23 is draped over the subassembly so that it spans the two portions of the handle hole 25 in a rather slack free manner as shown in phantom line in FIG. 2.

The subassembly 33 has an adhesive on the outer surfaces of the surfaces of the substrate 22 and the handle frame 28. This adhesive may be applied before or after the subassembly 33 is mounted on the pneumatic buck 34.

The sheet 35 of expanded vinyl is then heated and drawn against the outer top surfaces of the substrate 22 by vacuum pressure that is applied by a vacuum pump 36 via a plenum 37 and vacuum passages 38 of the pneumatic buck 34 that communicate with these surfaces via the pores 27 of the substrate 22. At the same time, the portion of the expanded vinyl sheet 35 that is draped over the handle frame 28 and the handle hole 25 is drawn toward an exposed surface 40 of the pneumatic buck 34 that is aligned with the handle hole 25. This stretches and draws draped portions 42 of the expanded vinyl sheet 35 partially around the handle frame 28 so that the expanded vinyl sheet 35 wraps about 200 degrees of the handle frame 28 as shown in solid line in FIG. 2.

The draped portions 42 are then cut out and removed leaving only small upper portions 44 and small lower portions 46 of the proper size and shape for the next step. These upper portions 44 are then wrapped around the underside of the handle frame 28 and tucked into the longitudinal slot 32 while the lower portions 46 are wrapped around the edge of the curved hole 25 as shown in dashed line in FIG. 2. These upper and lower portions 44 and 46 are bonded in place by a suitable adhesive. The handle frame 30 is how completely wrapped to provide a 360° handle 14 that spans an open handle hole 25 as shown in FIG. 1.

Figure 3:
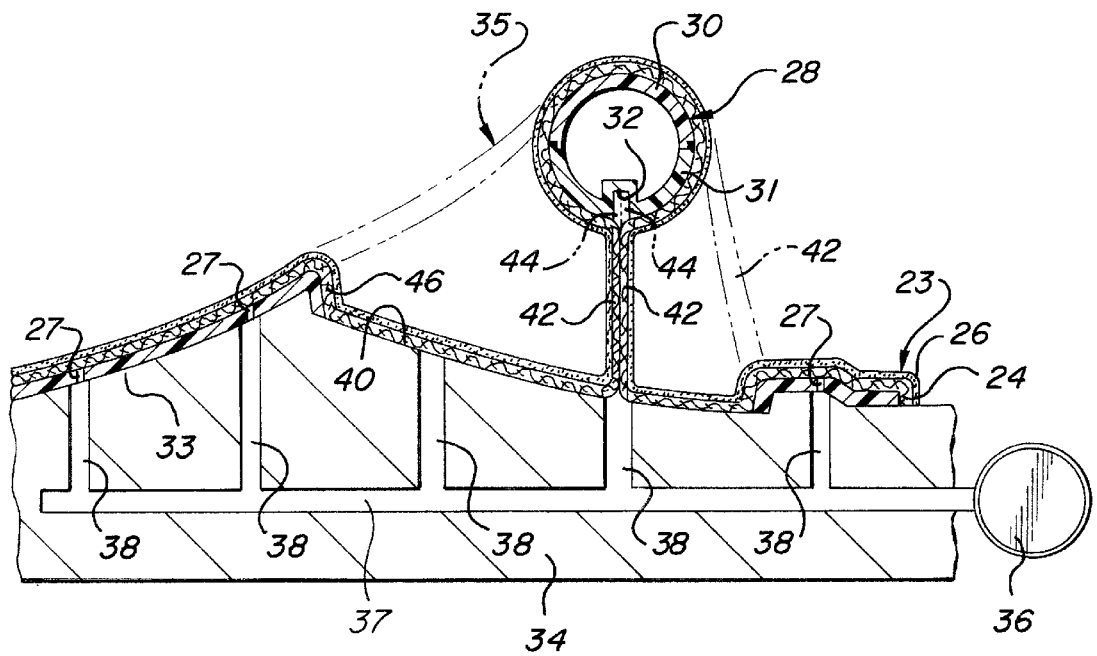
FIG. 3 is a section similar to FIG. 2 showing a second method for applying the outer decorative cover.

Referring now to FIG. 3, a second method for applying the outer decorative covering 23 is shown. In this second method the expanded vinyl sheet 35 for forming the decorative covering 23 is draped over the subassembly 33 in the same way, that is, so that it spans the two portions of the handle hole 25 in a rather slack free manner as shown in phantom line in FIG. 3. However, the portion of the expanded vinyl sheet 35 that is draped over the handle hole 25 is drawn toward the exposed surface 40 of the pneumatic buck 36 that is aligned with the handle hole 25 until the draped portions 42 of the expanded vinyl sheet 35 are drawn completely around the handle frame 28 and touch each other as shown in solid line in FIG. 3. The draped portions 42 are also wrapped around the edge of the handle hole 25 during the vacuum drawing operation. The draped portions 42 are then trimmed away leaving small upper portions 44 of the proper size and shape for being tucked into the longitudinal slot 32 as shown in dashed line in FIG. 3 and the lower portions 46 in place wrapped around the edge of the handle hole 25.

Figure 4:
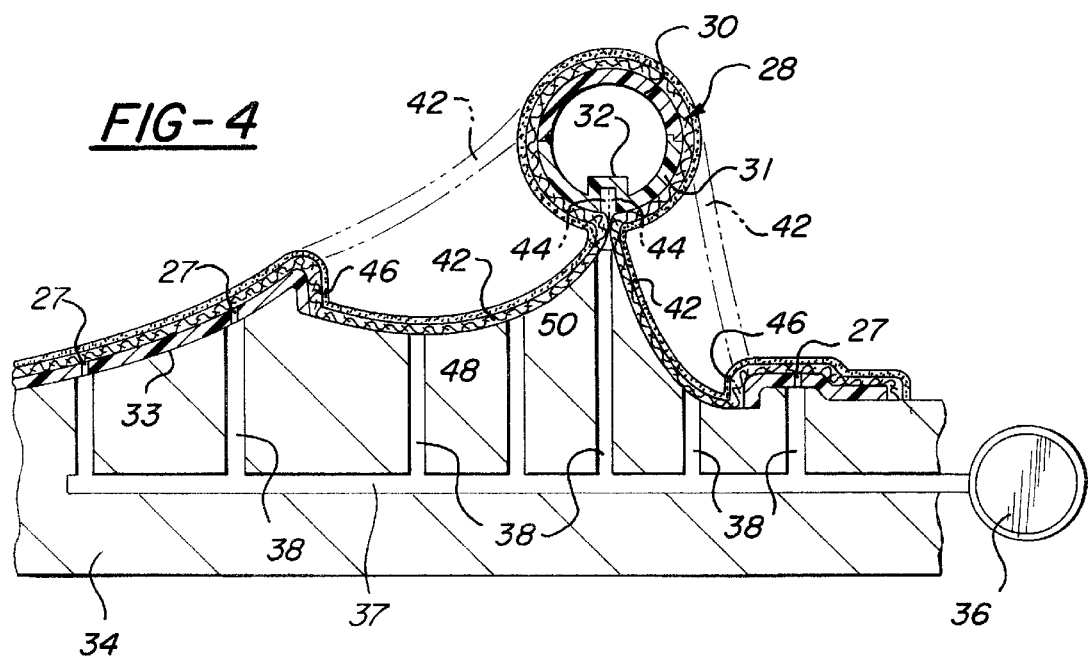
FIG. 4 is a section similar to FIGS. 2 and 3 showing a third method for applying the outer decorative cover.

FIG. 4 shows a third method for applying the outer decorative covering 23. In this third method, the pneumatic buck 34 is modified so that the exposed surface 48 of the pneumatic buck that is aligned with the handle hole 25 is cusp shaped comprising two convex surfaces leading up to a flat pointed apex 50 that is near and parallel to the longitudinal slot 32 at the bottom of the handle frame 28 and it is intersected by a number of the vacuum passages 38. This modified configuration of the buck 34 also draws the expanded vinyl sheet 35 completely around the handle frame 28 and edge of the handle hole 25 when vacuum is applied. However, this modified configuration reduces the amount of stretch that is required by the expanded vinyl sheet 35 when it is drawn toward the cusp-shaped surface 48. This reduction in stretch results in a thicker vinyl skin layer 24 on the underside of the handle 14.

The draped portions 42 of the expanded vinyl sheet 35 that is drawn as shown in solid line in FIG. 4 are then trimmed away as before leaving small upper portions 44 of the proper size shape for being tucked into the longitudinal slot 32 as shown in dashed line in FIG. 4 and lower portions 46 left in place wrapped around the edge of the handle hole 25.

While the methods of this invention have been described in connection with a pneumatic buck 34 that draws the expanded vinyl sheet 35 for forming the decorative cover 23 against the buck by vacuum pressure, it should be understood that decorative cover 23 could be formed against a properly shaped buck by other differential pressure forming methods. For instance, a positive pressure could be applied to the outer surface of the expanded vinyl sheet 35 after it is draped over the subassembly 33, or a combination of positive and vacuum pressures could be applied to the respective outer and inner draped sheet.

In other words, the invention has been described in an illustrative manner, and it is to be understood that the terminology which has been used is intended to be in the nature of words of description rather than of limitation.

Obviously, many modifications and variations of the present invention in light of the above teachings may be made. It is, therefore, to be understood that, within the scope of the appended claims, the invention may be practiced otherwise than as specifically described.

The embodiments of the invention in which an exclusive property or privilege is claimed are defined as follows:

1. A method of manufacturing a composite plastic article having an integral handle comprising the steps of:
   providing a structural substrate that has a handle hole of sufficient size to provide a space for gripping a handle that spans the hole,
   attaching a handle frame to the substrate so that it spans the handle hole,
   draping a sheet of stretchable material over the substrate and handle frame so that it covers the handle hole, and
   forming the stretchable sheet against the top of the structural substrate and at least partially around the handle frame by differential pressure applied to the draped sheet.

2. The method as defined in claim 1 wherein the substrate is porous and a vacuum pressure is applied to the draped sheet via the porous substrate and the handle hole.

3. The method as defined in claim 1 wherein the stretchable sheet is adhered to the top surface of the substrate and the top surface of the handle frame.

4. The method as defined in claim 1 wherein draped portions of the stretchable sheet are cut between the handle frame and an edge of the substrate defining the handle hole to provide portions that are wrapped around an underside of the handle frame.

5. The method as defined in claim 1 wherein the stretchable sheet is drawn against the top of the structural substrate and completely around the handle frame by vacuum applied to an underside of the sheet via a porous substrate and the handle hole.

6. The method as defined in claim 1 wherein the handle frame is formed with a longitudinal slot facing the handle hole and wherein draped portions of the stretchable sheet are cut between the handle frame and an edge of the handle hole and tucked into the longitudinal slot.

7. A method of manufacturing a composite plastic trim panel having an integral handle comprising the steps of:
   providing a porous structural substrate that has a handle hole of sufficient size to provide a space for gripping a handle that spans the handle hole,
   attaching a handle frame to the substrate so that it spans the handle hole,
   mounting the structural substrate on a pneumatic buck so that the pneumatic buck has an exposed surface in alignment with the handle hole,
   draping a sheet of stretchable plastic over the substrate and handle frame so that it covers the handle hole, and
   drawing the stretchable plastic sheet against the top of the structural substrate and at least partially around the handle frame by vacuum applied to the underside of the sheet from the pneumatic buck via the porous substrate and the handle hole.

8. The method as defined in claim 7 wherein the stretchable plastic sheet is drawn against the top of the structural substrate and completely around the handle frame by vacuum applied to the underside of the sheet via the porous substrate and the handle hole.

9. A method of manufacturing a composite plastic trim panel having an integral handle comprising the steps of:
   providing a porous structural substrate that has a handle hole of sufficient size to provide a space for gripping a handle that spans the handle hole,
   attaching a handle frame to the substrate so that it spans the handle hole,
   mounting the structural substrate on a pneumatic buck so that the pneumatic buck has an exposed surface in alignment with the handle hole,
   draping a sheet of stretchable plastic over the substrate and handle frame so that it covers the handle hole, and
   drawing the stretchable plastic sheet against the top of the structural substrate and at least partially around the handle frame by vacuum applied to the underside of the sheet from the pneumatic buck via the porous substrate and the handle hole, the exposed surface of the pneumatic buck being cusp shaped and projecting through the handle hole so as to engage and reduce stretching of the plastic sheet when it is drawn around the handle frame.

10. A method of manufacturing a composite plastic trim panel having an integral handle comprising the steps of:
    providing a porous structural substrate that has a handle hole of sufficient size to provide a space for gripping a handle that spans the handle hole,
    attaching a handle frame to the substrate so that it spans the handle hole,
    mounting the structural substrate on a pneumatic buck so that the pneumatic buck has an exposed surface in alignment with the handle hole,
    draping a sheet of stretchable plastic over the substrate and handle frame so that it covers the handle hole, and
    drawing the stretchable plastic sheet against the top of the structural substrate and completely around the handle of frame by vacuum applied to the underside of the sheet from the pneumatic buck via the porous substrate and the handle hole, the exposed surface of the pneumatic buck being cusp shaped and projecting through the handle hole so as to engage and reduce stretching of the plastic sheet when it is drawn around the handle.

11. A method of manufacturing a composite plastic trim panel having an integral handle comprising the steps of:
    providing a subassembly comprising a porous structural substrate that has a handle hole of sufficient size to provide a space for gripping a handle that spans the hole and a handle frame that is attached to the substrate so that it spans the handle hole,
    mounting the subassembly on a pneumatic buck so that the pneumatic buck has an exposed surface in alignment with the handle hole,
    draping a sheet of stretchable plastic over the subassembly so that it covers the handle frame and the handle hole, and
    drawing the stretchable plastic sheet against the top of the structural substrate and at least partially around the handle frame by vacuum applied to the underside of the sheet from the pneumatic buck via the subassembly and the exposed surface of the pneumatic buck.

12. The method as defined in claim 11 wherein the handle frame comprises a first part that is an integral part of the structural substrate and a second part that is attached to the first part and wherein one of the parts is formed so that it has a longitudinal slot facing handle hole.

13. The method as defined in claim 12 wherein draped portions of the stretchable plastic sheet are cut between the handle frame and an edge of the handle hole and tucked in longitudinal slot.

14. The method as defined in claim 13 wherein the stretchable plastic sheet is drawn against the top of the structural substrate and completely around the handle frame by vacuum applied to the underside of the sheet via the porous substrate and the handle hole.

15. The method as defined in claim 14 wherein the exposed surface of the pneumatic buck is cusp shaped to reduce stretching of the plastic sheet when it is drawn around the handle.

16. The method as defined in claim 15 wherein draped portions of the stretchable plastic sheet are cut between the handle frame and an edge of the handle hole and tucked in longitudinal slot.

17. The method as defined in claim 11 wherein draped portions of the stretchable plastic sheet are cut between the handle frame and an edge of the substrate defining the handle hole to provide portions that are wrapped around an underside of the handle frame.

18. The method as defined in claim 11 wherein the stretchable plastic sheet is drawn against the top of the structural substrate and completely around the handle frame by vacuum applied to the underside of the sheet via the porous substrate and the handle hole.

19. The method as defined in claim 18 wherein the exposed surface of the pneumatic buck is cusp shaped to reduce stretching of the plastic sheet when it is drawn around the handle.

20. The method as defined in claim 19 wherein draped portions of the stretchable plastic sheet are cut between the handle frame and an edge of the handle hole and tucked in longitudinal slot.

* * * * *